United States Patent [19]

Mori

[11] Patent Number: 5,094,825
[45] Date of Patent: Mar. 10, 1992

[54] PROCESS FOR TREATING WASTE GASES CONTAINING ClF₃

[75] Inventor: Yoichi Mori, Fujisawa, Japan

[73] Assignees: Ebara Corporation, Tokyo; Ebara Research Co., Ltd., Fujisawa, both of Japan

[21] Appl. No.: 647,352

[22] Filed: Jan. 29, 1991

[30] Foreign Application Priority Data

Feb. 5, 1990 [JP] Japan ................................ 2-24470

[51] Int. Cl.⁵ .................. B01D 53/34; C01D 7/00
[52] U.S. Cl. .................. 425/240 R; 423/210; 423/241; 55/71
[58] Field of Search .......... 423/240 R, 240 S, 462, 423/210, 241; 55/71

[56] References Cited

U.S. PATENT DOCUMENTS

| | | | |
|---|---|---|---|
| 3,469,936 | 9/1969 | Chilenskas et al. | 423/260 |
| 4,201,751 | 5/1980 | Holter et al. | 423/240 S |
| 4,673,558 | 6/1987 | Senoue et al. | 423/240 |
| 4,740,982 | 4/1984 | Hakuta et al. | 423/240 S |
| 4,971,880 | 11/1990 | Hotomi et al. | 427/41 |

FOREIGN PATENT DOCUMENTS

| | | | |
|---|---|---|---|
| 3403056 | 10/1984 | Fed. Rep. of Germany | 423/240 |
| 62-12322 | 1/1988 | Japan | 427/240 |
| 63-151608 | 6/1988 | Japan | 423/240 S |
| 1-301534 | 12/1989 | Japan | . |

OTHER PUBLICATIONS

TID-4500-15th Ed. K-1416 (1960), Safehandling of Chlorine Triflouride and the Chemistry of the Chlorine Oxides and Oxyflourides, R. Lynn Farrar, Jr.

Primary Examiner—John Niebling
Assistant Examiner—Brian M. Bolam
Attorney, Agent, or Firm—Oblon, Spivak, McClelland, Maier & Neustadt

[57] ABSTRACT

Waste gases containing ClF₃ are treated by bringing them into contact with iron oxide substantially composed of a ferric oxide ($Fe_2O_3$) at a linear velocity of about 10–200 cm/min at ordinary temperatures, or further into contact with an alkali agent at the same linear velocity and temperatures as the above, whereby the content of ClF₃ can be reduced below the permissible level despite simultaneous emission of acidic gases, and yet which is capable of removing the concomitant acidic gases in an effective manner.

6 Claims, No Drawings

PROCESS FOR TREATING WASTE GASES CONTAINING ClF₃

BACKGROUND OF THE INVENTION

1. Field of the Invention

The present invention relates to a process for treating waste gases containing $ClF_3$. More particularly, the present invention relates to a method by which waste gases that result from the step of dry cleaning the inside surfaces of processing apparatus and related jigs in semiconductor device fabrication with $ClF_3$ can be rendered harmless by removing not only $ClF_3$ but also acidic gases including $SiCl_4$, $SiF_4$, $Cl_2$ and $F_2$.

2. Description of the Prior Art:

In order to meet the recent demand for reducing the feature size of VLSIs and improving the efficiency of their fabrication, there has been a growing need for auto-cleaning the inside surfaces of CVD and PVD apparatus as well as related jigs in the fabrication of semiconductor devices. In this respect, the effectiveness of $ClF_3$ has attracted the attention of manufacturers since it is capable of plasmaless cleaning at low concentrations and temperatures. However, $ClF_3$ has a very high level of toxicity (TLV-TWA=0.1 ppm) and it is strongly desired to establish a method of rendering $ClF_3$ harmless. Common methods for making $ClF_3$ harmless include wet systems using a scrubber with aqueous alkaline solutions and dry systems using soda lime or activated alumina.

In the prior art, $ClF_3$ cannot be completely removed by single use of treating agents such as alkali agents or activated alumina. In addition, chlorine oxides are released by reaction with the treating agents used. Further, acidic gases such as $SiCl_4$, $SiF_4$, $Cl_2$ and $F_2$ that are discharged together with $ClF_3$ can only be partially removed, or they can only be removed in very small amounts.

SUMMARY OF THE INVENTION

It is an object of the present invention to provide a process for treating $ClF_3$ containing gases by which the content of $ClF_3$ can be reduced below the TLV-TWA level despite simultaneous emission of acidic gases, and yet which is capable of removing the concomitant acidic gases in an effective manner.

Other objects and advantages of the present invention will be become apparent to those skilled in the art from the following description and disclosure.

DETAILED DESCRIPTION OF THE INVENTION

In its first aspect, the present invention attains its object by bringing a waste gas containing $ClF_3$ into contact with an iron oxide at ordinary temperatures.

In its second aspect, the present invention attains its object by bringing a waste gas containing $ClF_3$ into contact first with an iron oxide at ordinary temperatures and then with an alkali agent. In this second approach, a waste gas containing not only $ClF_3$ but also acidic gases such as $SiCl_4$, $SiF_4$, $Cl_2$ and $F_2$ is treated by the present invention in the following specific way: first, the waste gas is brought into contact with an iron oxide at ordinary temperatures so that $ClF_3$ in the waste gas is fixed as an iron fluoride or chloride on the surface of the iron oxide; secondly, gaseous fluorides and chlorides that are released as by-products are nearly removed by an alkali agent so that the waste gas becomes harmless.

When a waste gas containing $ClF_3$ is brought into contact with an iron oxide, $ClF_3$ is fixed as an iron fluoride or chloride on the surface of the iron oxide. An example of the reaction between $ClF_3$ and iron oxide is represented as follows:

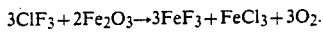

$$3ClF_3 + 2Fe_2O_3 \rightarrow 3FeF_3 + FeCl_3 + 3O_2.$$

While $ClF_3$ is fixed as $FeF_3$ and $FeCl_3$ on the surface of iron oxide, gaseous fluorides and chlorides are released as, for example, $ClO_2$, $FO_2$, $HCl$, $HF$, etc. These gaseous components are removed by neutralization through contact with the alkali agent. The other acidic gases in the waste gas can be substantially fixed as the iron fluorides and chlorides by mere contact with the iron oxide.

The iron oxide to be used in the present invention may be any ordinary commercial product as long as it is substantially composed of ferric oxide ($Fe_2O_3$). Further, this iron oxide may be granular, rod-shaped, tabular or in any other form that is easy to handle and it need not be treated or processed in any special way to have a particularly high purity.

The alkali agent to be used in the present invention is preferably at least one alkaline earth metal compound selected from the group consisting of calcium hydroxide, calcium oxide, magnesium hydroxide or magnesium oxide. The shape of this alkali agent also is not limited in any particular way.

On the condition that an undesirably high pressure loss does not occur in the passage of waste gases, the particles of those treating agents are preferably as small as possible, desirably in the range of about 3–32 mesh, more desirably about 7–16 mesh, in order to ensure a large contact area.

The waste gases need be treated at ordinary temperatures and using elevated temperatures is not economical in view of the need to make the material and construction of the apparatus heat-resistant.

The waste gases are allowed to pass through said treating agents at a linear velocity (LV) of about 10–200 cm/min, preferably about 10–100 cm/min, to attain contact between said waste gases and said treating agents.

In practice, a column may be packed with two stages of treating agents (iron oxide and alkali agent) in specific amounts that depend on the load of a waste gas to be treated; then, the waste gas is supplied into the column either downwardly or upwardly so that it is brought into contact first with the iron oxide and then with the alkali agent.

EXAMPLES

The following examples are provided for the purpose of further illustrating the present invention but are in no way to be taken as limiting.

EXAMPLE 1 AND COMPARATIVE EXAMPLES 1-3

A polyacrylic vessel (40 mm$^\phi$) was packed with four different treating agents to a height of 50 mm and supplied with $N_2$ diluted $ClF_3$ (1 v/v %) at a flow rate of 0.3 l/min (LV=about 24 cm/min) at ordinary temperatures. In order to monitor the concentration of $ClF_3$ at the exit end, the concentration of chlorine oxides was measured with a detection tube (produced by Gastec Corporation). The treatment was continued until the concentration of chlorine oxides exceeded the detection limit (0.1 ppm as TLV) and the throughput of $ClF_3$ treatment was determined from the cumulative volume of $ClF_3$ and the amount of each treating agent packed. At the same time, the amounts of gaseous fluoride and chloride compounds that evolved as by-products of the treatment at the exit end of the layer of each treating agent were measured by the combination of absorption by alkali solution and ion-exchange chromatography.

The treating agents used were commercial products in a granular form having particle sizes of 7-16 mesh.

The results are shown in Table 1. When $Fe_2O_3$ was used as a treating agent, the throughput was the highest (13 l of $ClF_3$ per liter of treating agent) but fluorides and chlorides were detected as by-products. Comparative treating agents, $Al_2O_3$, CaO.NaOH and $Ca(OH)_2$, achieved much lower throughputs with high yields of by-products.

TABLE 1

|  | Treating agent | Concentration of $ClF_3$ (v/v %) | Throughput of $ClF_3$ (l-$ClF_3$/l-treating agent) | Amount of F evolution: total F as $ClF_3$ (ppm) | Amount of Cl evolution: total Cl as $ClF_3$ (ppm) |
| --- | --- | --- | --- | --- | --- |
| Ex. 1 | $Fe_2O_3$ | 1 | 13 | 0.19-0.32 (0.26) | 0.43-0.51 (0.47) |
| Comp. Ex. 1 | $Al_2O_3$ gel | 1 | 1.3 | 2.1-3.2 (2.6) | 2.9-4.2 (3.4) |
| 2 | CaO.NaOH | 1 | 0.6 | 4.5-6.3 (5.2) | 3.7-7.1 (5.9) |
| 3 | $Ca(OH)_2$ | 1 | 0 | — | — |

Note: Numerals in parentheses refer to average values.

EXAMPLES 2-5

The ability of $Fe_2O_3$ to treat acidic gases was evaluated using an apparatus of the same type as used in Example 1. The $Fe_2O_3$ used as the treating agent was also of the same type as in Example 1. Four acidic gases, $SiCl_4$, $SiF_4$, $Cl_2$ and $F_2$, each (2 v/v %) diluted with $N_2$ was individually supplied into the apparatus at a flow rate of 0.3 l/min (LV=about 24 cm/min) at ordinary temperatures. The treatment was continued until these gases were detected with a detection tube at the exit end of the apparatus, the detection limit of $SiCl_4$, $SiF_4$, $Cl_2$ and $F_2$ being 5 ppm as HCl, 3 ppm as HF, 1 ppm and 1 ppm, respectively. Their throughputs were determined from the cumulative volumes of the input gases. The results are shown in Table 2. It was verified that the four acidic gases under test could be removed using $Fe_2O_3$.

TABLE 2

|  | Treating agent | Acidic gas | Gas concentration (v/v %) | Throughput (l/l) |
| --- | --- | --- | --- | --- |
| Example 2 | $Fe_2O_3$ | $SiCl_4$ | 2 | 16 |
| 3 | $Fe_2O_3$ | $SiF_4$ | 2 | 35 |
| 4 | $Fe_2O_3$ | $Cl_2$ | 2 | 3 |
| 5 | $Fe_2O_3$ | $F_2$ | 2 | 45 |

EXAMPLE 6

A polyacrylic vessel (40 mm$^\phi$) was divided into two stages, one of which was packed with $Fe_2O_3$ to a height of 200 mm and the other being packed with $Ca(OH)_2$ to a height of 50 mm. The $Fe_2O_3$ and $Ca(OH)_2$ used were of the same types as used in Example 1 and Comparative Example 3, respectively. A $N_2$ diluted gaseous mixture of $ClF_3$ and $SiF_4$ was supplied into the vessel at a flow rate of 0.3 l/min (LV=about 24 cm/min) at ordinary temperatures so that it would first pass through the layer of $Fe_2O_3$, then through the layer of $Ca(OH)_2$. The concentrations of $ClF_3$ and $SiF_4$ were each 1 v/v % at the entrance to the vessel.

The amounts of discharged chlorine oxide, fluorides and chlorides were measured at the exit end of the $Ca(OH)_2$ layer. The treatment was continued for 830 minutes and it was verified that those components had been removed to levels below their detection limit (0.1 ppm as $ClF_3$).

According to the present invention, not only $ClF_3$ but also concomitant acidic gases can be effectively removed. Further, the treating agents used in the method of the present invention have such a high throughput that they need not be replaced for a prolonged period of time.

What is claimed is:

1. A process for treating a waste gas containing $ClF_3$ comprising bringing said waste gas into contact with an iron oxide substantially composed of ferric oxide ($Fe_2O_3$) at a linear velocity of about 10-200 cm/min at ambient temperature, thereby depleting $ClF_3$ concentration in said waste gas.

2. A process according to claim 1 wherein said linear velocity is about 10-100 cm/min.

3. A process according to claim 1 wherein said linear velocity is about 24 cm/min.

4. A process for treating a waste gas containing $ClF_3$ comprising bringing said waste gas into contact first with an iron oxide substantially composed of ferric oxide ($Fe_2O_3$) at a linear velocity of about 10-200 cm/min at ambient temperature and second with an alkali agent at a linear velocity of about 10-200 cm/min at ambient temperature, said alkali agent comprising at least one alkaline earth metal compound selected from the group consisting of calcium hydroxide, calcium oxide, magnesium hydroxide and magnesium oxide, thereby depleting $ClF_3$ concentration in said waste gas.

5. A process according to claim 4 wherein said each linear velocity is about 10-100 cm/min.

6. A process according to claim 4 wherein said each linear velocity is about 24 cm/min.

* * * * *